(12) United States Patent
Koike

(10) Patent No.: US 9,108,597 B2
(45) Date of Patent: Aug. 18, 2015

(54) AUXILIARY BRAKING DEVICE FOR VEHICLE

(75) Inventor: Masaki Koike, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 493 days.

(21) Appl. No.: 13/574,037

(22) PCT Filed: Jan. 19, 2011

(86) PCT No.: PCT/JP2011/050826
§ 371 (c)(1),
(2), (4) Date: Jul. 19, 2012

(87) PCT Pub. No.: WO2011/090056
PCT Pub. Date: Jul. 28, 2011

(65) Prior Publication Data
US 2012/0295762 A1    Nov. 22, 2012

(30) Foreign Application Priority Data

Jan. 20, 2010   (JP) ................................. 2010-010263

(51) Int. Cl.
| | |
|---|---|
| *B60W 10/18* | (2012.01) |
| *B60T 7/04* | (2006.01) |
| *B60T 8/48* | (2006.01) |
| *B60T 13/66* | (2006.01) |
| *B60T 13/68* | (2006.01) |
| *B60W 50/10* | (2012.01) |
| *B60W 10/06* | (2006.01) |

(52) U.S. Cl.
CPC . *B60T 7/042* (2013.01); *B60T 8/48* (2013.01); *B60T 13/662* (2013.01); *B60T 13/686* (2013.01); *B60W 10/06* (2013.01); *B60W 10/18* (2013.01); *B60W 50/10* (2013.01); *B60L 2240/461* (2013.01); *B60T 2260/08* (2013.01); *B60W 2710/0605* (2013.01); *Y10T 477/814* (2015.01)

(58) Field of Classification Search
CPC .. B60W 10/18; B60W 10/184; B60W 10/188
See application file for complete search history.

(56) References Cited

U.S. PATENT DOCUMENTS

2006/0131956 A1*   6/2006  Matsuura et al. ............. 303/152

FOREIGN PATENT DOCUMENTS

| JP | 64-016445 A | 1/1989 |
|---|---|---|
| JP | 64-029032 U | 2/1989 |
| JP | 06-344889 A | 12/1994 |
| JP | 08-108842 A | 4/1996 |
| JP | 08-318843 A | 12/1996 |
| JP | 11-342841 A | 12/1999 |
| JP | 2009-234563 A | 10/2009 |

* cited by examiner

*Primary Examiner* — Huan Le
(74) *Attorney, Agent, or Firm* — Carrier Blackman & Associates, P.C.; Joseph P. Carrier; Jeffrey T. Gedeon

(57) ABSTRACT

An auxiliary braking device for a vehicle includes an accelerator pedal operation amount detection unit, a brake pedal operation amount detection unit, a wheel speed detection unit, and a wheel speed difference calculation unit. The wheel speed difference calculation unit calculates a wheel speed difference between the wheel speeds of a front wheel and a rear wheel based on a signal of the wheel speed output from the wheel speed detection unit, and outputs a signal of the calculation result. In addition, the braking assistance unit assists in braking the vehicle in a case where the wheel speed difference obtained by the wheel speed difference calculation unit is greater than or equal to a predetermined value.

8 Claims, 4 Drawing Sheets

AUXILIARY BRAKING DEVICE FOR VEHICLE

TECHNICAL FIELD

The present invention relates to an auxiliary braking device for a vehicle.

Priority is claimed on Japanese Patent Application No. 2010-010263, filed on Jan. 20, 2010, the content of which is incorporated herein by reference.

BACKGROUND ART

Hitherto, a device has become known which includes an impeding member that is joined to a brake pedal and impedes the operation of an accelerator wire, and when the brake pedal and an accelerator pedal are operated at the same time, by using the impeding member to impede the operation of the accelerator wire, prohibits an increase in engine speed (for example, refer to Patent Document 1).

In addition, hitherto, a device has also become known which reduces at least one of an intake air amount or a fuel supply amount to an engine, for example, during the operation of a braking device (for example, refer to Patent Document 2).

CITATION LIST

Patent Document

[Patent Document 1] Japanese Unexamined Utility Model Application, First Publication No. S64-29032
[Patent Document 2] Japanese Unexamined Patent Application, First Publication No. S64-16445

SUMMARY OF INVENTION

Technical Problem

However, with the devices according to the related art, since only the operation of the engine is automatically suppressed by being linked with the operation of the brake pedal or the braking device, the driver's intention during driving is not appropriately reflected, and there is a possibility that the driver feels a sense of strangeness for vehicle behavior.

In order to solve the above problems, an object of the invention is to provide an auxiliary braking device for a vehicle capable of precisely reflecting a driver's intention during driving in the running behavior of a vehicle while ensuring the running safety of the vehicle even in an incorrect driving operation by the driver.

Solution to Problem

The invention employs the following means to achieve the object and to solve the problems.

(1) An auxiliary braking device for a vehicle according to an aspect of the invention includes: an accelerator pedal operation amount detection unit which detects the operation amount of an accelerator pedal of a vehicle and outputting a signal of the detection result; a brake pedal operation amount detection unit which detects the operation amount of a brake pedal of the vehicle and outputting a signal of the detection result; a braking assistance unit which assists in braking the vehicle based on a signal output from each of the accelerator pedal operation amount detection unit and the brake pedal operation amount detection unit; a wheel speed detection unit which detects a wheel speed which is the rotational speed of a wheel of the vehicle and outputting a signal of the detection result; and a wheel speed difference calculation unit which calculates a wheel speed difference between the wheel speeds of a front wheel and a rear wheel based on the signal of the wheel speed output from the wheel speed detection unit and outputting a signal of the calculation result, wherein the braking assistance unit assists in braking the vehicle in a case where the wheel speed difference of the signal output from the wheel speed difference calculation unit is greater than or equal to a predetermined value.

(2) In the auxiliary braking device for a vehicle described in (1), the braking assistance unit may assist in braking the vehicle by driving the throttle of the vehicle in a closing direction.

(3) In the auxiliary braking device for a vehicle described in (1), in a case where the vehicle includes a motor driven for running, the braking assistance unit may assist in braking the vehicle by reducing or stopping a current applied to the motor.

(4) In the auxiliary braking device for a vehicle described in (1), the braking assistance unit may assist in braking the vehicle by increasing the pressurization amount of a wheel cylinder of the vehicle corresponding to the operation amount of the brake pedal.

(5) In the auxiliary braking device for a vehicle described in any one of (1) to (4), a prohibition unit may further be included for prohibiting the assistance in braking by the braking assistance unit in a case where the operation amount of the accelerator pedal is increased after the operation amount of the brake pedal is increased.

(6) In the case of the auxiliary braking device for a vehicle described in (5), a configuration may be employed in which a steering angle detection unit which detects a steering angle of the vehicle and outputting a signal of the detection result is further included, and the prohibition unit prohibits the assistance in braking by the braking assistance unit in a case where the change amount of the steering angle obtained from the steering angle detection unit is greater than or equal to a predetermined steering angle change amount and the operation amount of the accelerator pedal is increased after the operation amount of the brake pedal is increased.

Advantageous Effects of Invention

According to the auxiliary braking device for a vehicle described in (1), in the case where the wheel speed difference between the wheel speeds of the front wheel and the rear wheel is less than the predetermined wheel speed difference, acceleration depending on the driver's intention during driving (that is, control of the throttle opening corresponding to the operation amount of the acceleration pedal) is allowed. On the other hand, in a case where the wheel speed difference is greater than or equal to the predetermined wheel speed difference, assistance in braking the vehicle is performed without attention to the driver's intention during driving, so that the driver's intention during driving can be precisely reflected in the running behavior of the vehicle while ensuring the running safety of the vehicle even in an inappropriate driving operation.

In the case described in any of (2) to (4), since the assistance in braking the vehicle can be precisely performed, the running safety of the vehicle even in an inappropriate driving operation can be ensured.

In the case described in (5) or (6), the driver's intention to accelerate can be precisely reflected in the running behavior of the vehicle.

DESCRIPTION OF EMBODIMENTS

Hereinafter, an auxiliary braking device for a vehicle according to an embodiment of the invention will be described with reference to the accompanying drawings.

Figure 1:
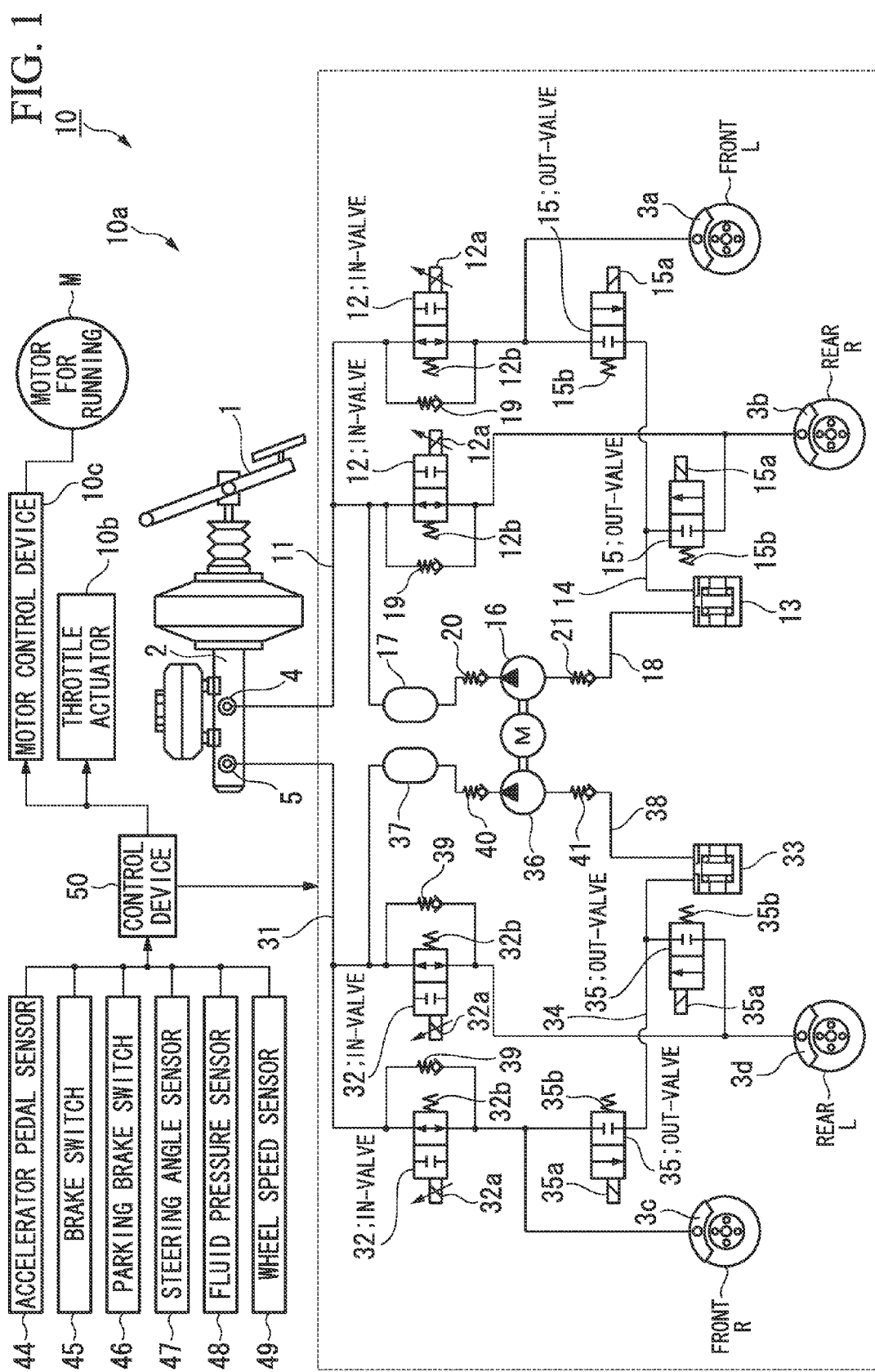
FIG. 1 is a diagram of the configuration of a braking device to which an auxiliary braking device for a vehicle according to an embodiment of the invention is applied.

As illustrated in FIG. 1, an auxiliary braking device for a vehicle 10 of this embodiment includes a braking device 10a of the vehicle, a throttle actuator 10b, a motor control device 10c controlling the driving of a motor M for running, an accelerator pedal sensor 44, a brake switch 45, a parking brake switch 46, a steering angle sensor 47, a fluid pressure sensor 48, a wheel speed sensor 49, and a control device 50.

The braking device 10a includes a master cylinder 2 as a brake fluid pressure generator that generates a brake fluid pressure by an operation of a brake pedal 1 by a driver. The master cylinder 2 includes an output port 4 connected to each of, for example, wheel cylinders 3a and 3b of a left front wheel FL and a right rear wheel RR, and an output port 5 connected to each of wheel cylinders 3c and 3d of a right front wheel FR and a left rear wheel RL.

The output port 4 of the master cylinder 2 is connected to each of the wheel cylinders 3a and 3b of the left front wheel FL and the right rear wheel RR with a connection passage 11, and normally open solenoid valves 12 and 12 are inserted into the connection passage 11 in parallel for the wheel cylinders 3a and 3b.

In addition, the wheel cylinders 3a and 3b are connected to a reservoir 13 releasing the brake fluid pressures in the wheel cylinders 3a and 3b with a release passage 14. Normally closed solenoid valves 15 and 15 are inserted into the release passage 14 in parallel for the wheel cylinders 3a and 3b.

In the reservoir 13, a brake fluid sent from each of the wheel cylinders 3a and 3b may be stored. The brake fluid is returned to the master cylinder 2 side via a return passage 18 into which a pump 16 and a damper chamber 17 provided on the upstream side of the pump 16 for absorbing pump pulsations are inserted.

Check valves 19 that allow the brake fluid to flow from the wheel cylinders 3a and 3b to the master cylinder 2 side are provided in parallel to the normally open solenoid valves 12. In addition, check valves 20 and 21 that allow the brake fluid to flow from the wheel cylinders 3a and 3a to the master cylinder 2 side are provided in series on the upstream side and the downstream side of the pump 16.

The output port 5 of the master cylinder 2 is connected to each of the wheel cylinders 3c and 3d of the right front wheel FR and the left rear wheel RL with a connection passage 31. Normally open solenoid valves 32 and 32 are inserted into the connection passage 31 in parallel for the wheel cylinders 3c and 3d.

The wheel cylinders 3c and 3d are connected to a reservoir 33 releasing the brake fluid pressures in the wheel cylinders 3c and 3d with a release passage 34. Normally closed solenoid valves 35 and 35 are inserted into the release passage 34 in parallel for the wheel cylinders 3c and 3d.

In the reservoir 33, the brake fluid sent from each of the wheel cylinders 3c and 3d may be stored. The brake fluid is returned to the master cylinder 2 side via a return passage 38 into which a pump 36 and a damper chamber 37 provided on the upstream side of the pump 36 for absorbing pump pulsations are inserted.

Check valves 39 that allow the brake fluid to flow from the wheel cylinders 3c and 3d to the master cylinder 2 side are provided in parallel to the normally open solenoid valves 32. In addition, check valves 40 and 41 that allow the brake fluid to flow from the wheel cylinders 3c and 3d to the master cylinder 2 side are provided in series on the upstream side and the downstream side of the pump 36.

The normally open solenoid valves 12 and 32 communicate with each other by biasing forces of return springs 12b and 32b in a state where no current is applied to the solenoids 12a and 32a, and the brake fluid pressure of the master cylinder 2 increases the wheel cylinder pressure of each of the wheel cylinders 3a, 3b, 3c, and 3d.

When current is applied to each of the solenoids 12a and 32a, the normally open solenoid valves 12 and 32 are blocked against the biasing forces of the return springs 12b and 32b, and the wheel cylinder pressure in each of the wheel cylinders 3a, 3b, 3c, and 3d is maintained.

In the state where no current is applied to the solenoids 15a and 35a, the normally closed solenoid values 15 and 35 are blocked by biasing forces of return springs 15b and 35b. When current is applied to each of the solenoids 15a and 35a, the normally closed solenoid valves 15 and 35 communicate with each other against the biasing forces of the return springs 15b and 35b, and the brake fluid escapes from each of the wheel cylinders 3a, 3b, 3c, and 3d, so that the wheel cylinder pressures are reduced.

In addition, the normally open solenoid valves 12 and 32 are transited from the normally open state at normal positions with no applied current to the closed state at a switching position by the current applied. On the other hand, the normally closed solenoid valves 15 and 35 are transited from the normally closed state at normal positions with no applied current to the open state at the switching position by the current applied. This is because operation compensation during malfunction, a so-called fail safe, is employed.

In addition, in the normally open solenoid valves 12 and 32, when the brake fluid pressure is applied from the master cylinder 2 side via the connection passages 11 and 31, this brake fluid pressure is exerted in the same directions as the biasing directions of the return springs 12b and 32b, that is, in a direction to reach the open state.

The normally open solenoid valves 12 and 32, the normally closed solenoid valves 15 and 35, and a motor (not shown) for driving the pumps 16 and 36 are controlled by the control device 50.

The control device 50 controls the brake fluid pressure of each of the wheel cylinders 3a, 3b, 3c, and 3d based on a detection signal output from each of the accelerator pedal sensor 44, the brake switch 45, the parking brake switch 46, the steering angle sensor 47, the fluid pressure sensor 48, and the wheel speed sensor 49, controls a throttle opening using the throttle actuator 10b, and controls the amount of current applied to the motor M for running using the motor control device 10c.

The accelerator pedal sensor 44 detects the pressing amount of an accelerator pedal (not shown) by the driver and outputs a signal of the detection result to the control device 50.

The brake switch 45 detects presence or absence of a pressing operation of the brake pedal 1 by the driver (that is, ON or OFF state of the brake switch 45) and outputs a signal of the detection result to the control device 50.

The parking brake switch 46 detects the presence or absence of a pressing operation of a parking brake (not shown) by the driver (that is, ON or OFF state of the parking brake switch 46) and outputs a signal of the detection result to the control device 50.

The steering angle sensor 47 detects a steering angle corresponding to a steering input by the driver and outputs a signal of the detection result to the control device 50.

The fluid pressure sensor 48 detects the brake fluid pressure of each of the wheel cylinders 3a, 3b, 3c, and 3d and outputs a signal of the detection result to the control device 50.

The wheel speed sensor 49 detects a speed of each of the front wheels FL and FR and the rear wheels RL and RR on the left and right (wheel speeds VW_FL, VW_FR, VW_RL, and VW_RR) and outputs a signal of the detection result.

The control device 50 controls assistance in braking the vehicle based on, for example, the pressing operation mount of the accelerator pedal by the driver output from the accelerator pedal sensor 44 and the brake fluid pressure output from the fluid pressure sensor 48 corresponding to the pressing operation amount of the brake pedal 1 by the driver. Moreover, the control device 50 assists in braking the vehicle based on the wheel speeds output from the wheel speed sensor 49 in a case where the wheel speed difference which is the difference between the wheel speeds of the front wheel and the rear wheel is greater than or equal to a predetermined value.

In addition, the control device 50 assists in braking the vehicle by, for example, driving the throttle to have a throttle opening in a closing direction using the throttle actuator 10b.

In addition, the control device 50 assists in braking the vehicle by, for example, either reducing the amount of current applied to the motor M for running or stopping the current application using the motor control device 10c.

In addition, the control device 50 assists in braking the vehicle by, for example, increasing the pressurization amount of the brake fluid pressure of each of the wheel cylinders 3a, 3b, 3c, and 3d.

In addition, the control device 50 prohibits the assistance in braking the vehicle, for example, in a case where the pressing operation amount of the accelerator pedal after an increase in the pressing operation amount of the brake pedal 1 by the driver (that is, after an increase in the brake fluid pressure corresponding to the pressing operation amount of the brake pedal 1) is increased up to a predetermined operation amount or higher and a change in the steering angle output from the steering angle sensor 47 is greater than or equal to a predetermined change amount.

The process of the auxiliary braking device 10 for a vehicle of this embodiment having the above configuration, that is, a process of assisting in braking the vehicle will now be described.

Figure 2:
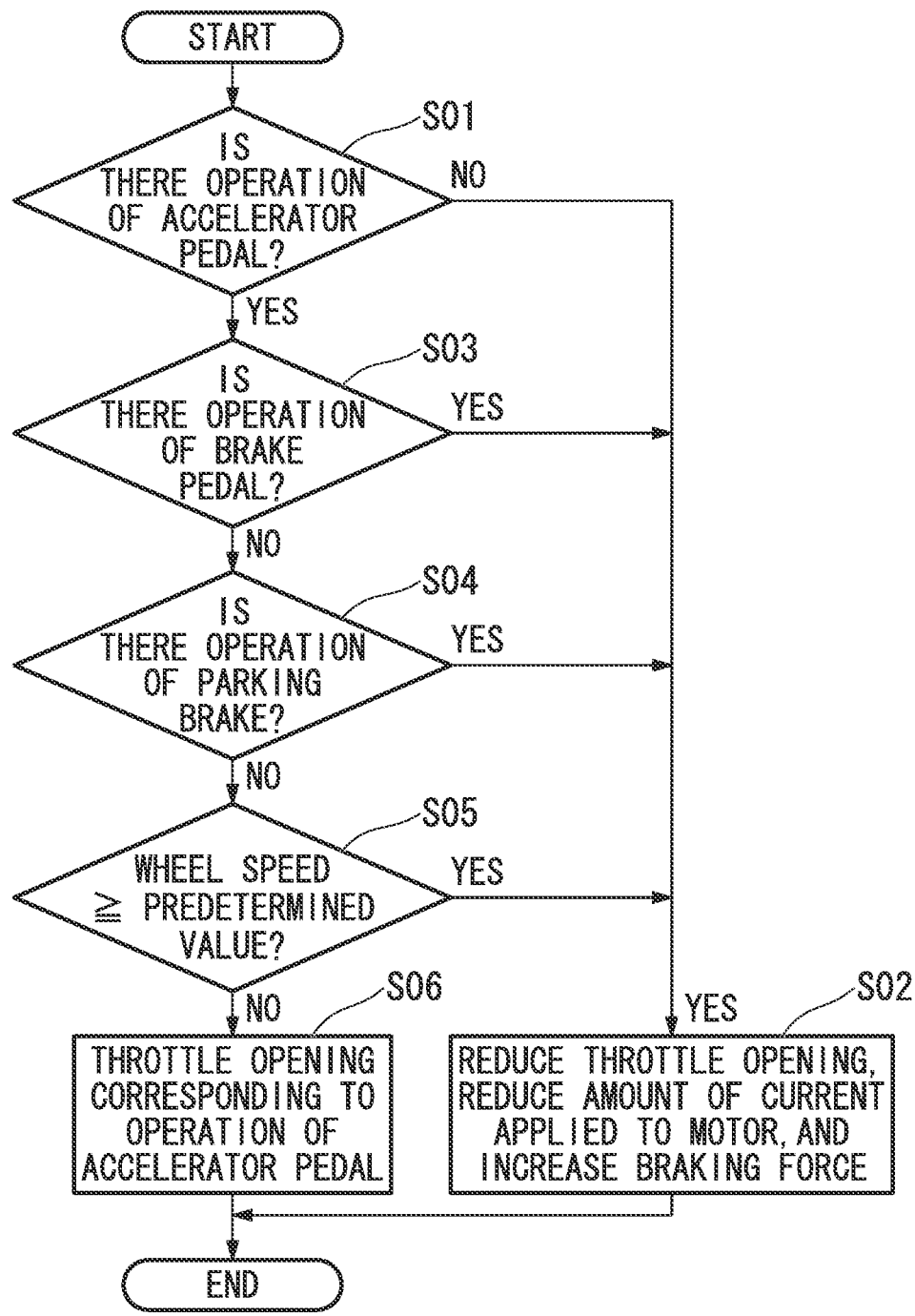
FIG. 2 is a flowchart showing the process of the auxiliary braking device for a vehicle.

First, for example, in Step S01 shown in FIG. 2, it is determined whether or not there is an operation of the accelerator pedal.

In the case of "No" as the determination result, the process proceeds to Step S02. In Step S02, the throttle opening is reduced, the amount of current applied to the motor M for running is reduced, and the pressurization amount of the brake fluid pressure of each of the wheel cylinders 3a, 3b, 3c, and 3d is increased, thereby assisting in braking the vehicle, and the process ends.

On the other hand, in the case of "YES" as the determination result, the process proceeds to Step S03.

In Step S03, it is determined whether or not there is an operation of the brake pedal 1 by, for example, whether or not the brake switch is ON or by whether or not the brake fluid pressure is greater than or equal to a predetermined pressure.

In the case of "YES" as the determination result, the process proceeds to the above-mentioned Step S02, and the process ends.

On the other hand, in the case of "NO" as the determination result in Step S03, the process proceeds to Step S04.

In Step S04, it is determined whether or not there is an operation of the parking brake by, for example, whether or not the parking brake switch is ON.

In the case of "YES" as the determination result, the process proceeds to the above-mentioned Step S02 and the process ends.

On the other hand, in the case of "NO" as the determination result in Step S04, the process proceeds to Step S05.

In Step S05, it is determined whether or not the wheel speed difference between the wheel speeds of the front wheel and the rear wheel is greater than or equal to the predetermined value.

In the case of "YES" as the determination result, the process proceeds to the above-mentioned Step S02 and the process ends.

On the other hand, in the case of "NO" as the determination result in Step S05, the process proceeds to Step S06.

In Step S06, assistance in braking the vehicle is not performed, the throttle is controlled to have a throttle opening corresponding to the pressing amount of the accelerator pedal, and the process ends.

As described above, according to the auxiliary braking device 10 for a vehicle of this embodiment, in the case where the wheel speed difference between the wheel speeds of the front wheel and the rear wheel is less than the predetermined value, acceleration by the driver's intention during driving (that is, control of the throttle opening corresponding to the operation amount of the acceleration pedal) is allowed, and in the case where the wheel speed difference is greater than or equal to the predetermined value, assistance in braking the vehicle is performed without attention to the driver's intention during driving. By performing such control, the driver's intention during driving may be precisely reflected in the running behavior of the vehicle while ensuring the running safety of the vehicle even in an inappropriate driving operation.

Hereinafter, a first modified example of this embodiment will be described.

Figure 3:
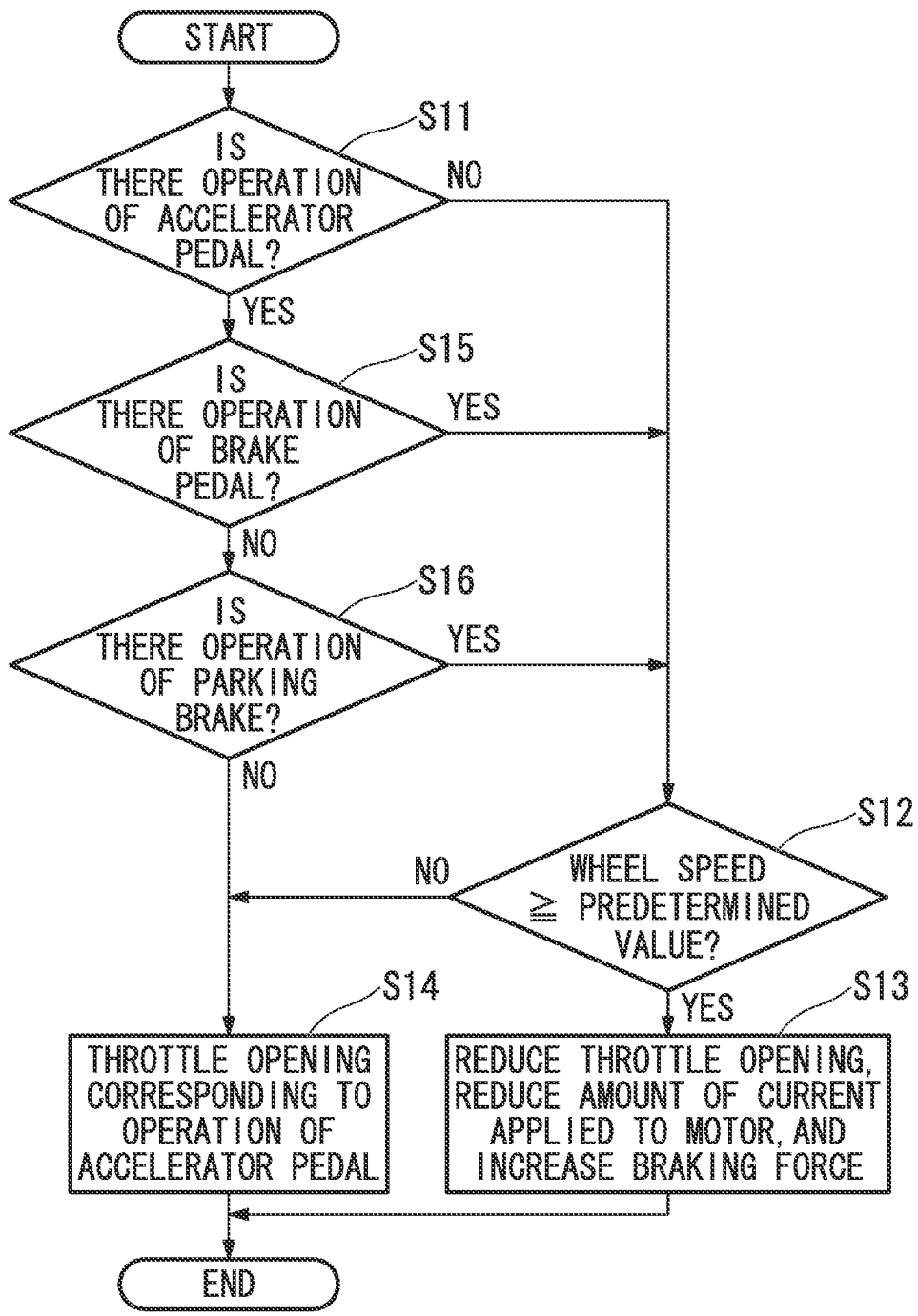
FIG. 3 is a flowchart showing the process of a first modified example of the auxiliary braking device for a vehicle.

In the first modified example, first, for example, in Step S11 shown in FIG. 3, it is determined whether or not there is an operation of the accelerator pedal.

In the case of "YES" as the determination result, the process proceeds to Step S15 described later.

On the other hand, in the case of "NO" as the determination result, the process proceeds to Step S12. In Step S12, it is determined whether or not the wheel speed difference between the wheel speeds of the front wheel and the rear wheel is greater than or equal to the predetermined value.

In the case of "YES" as the determination result in Step S12, the process proceeds to Step S13. In Step S13, the throttle opening is reduced, the amount of current applied to the motor M for running is reduced, and the pressurization amount of the brake fluid pressure of each of the wheel cylinders 3a, 3b, 3c, and 3d is increased, thereby assisting in braking the vehicle, and the process ends.

On the other hand, in the case of "NO" as the determination result in Step S12, the process proceeds to Step S14. In Step S14, assistance in braking the vehicle is not performed, the throttle is controlled to have a throttle opening corresponding to the pressing amount of the accelerator pedal, and the process ends.

In addition, in Step S15, it is determined whether or not there is an operation of the brake pedal 1 by, for example, whether or not the brake switch is ON or by whether or not the brake fluid pressure is greater than or equal to a predetermined pressure.

In the case of "YES" as the determination result, the process proceeds to the above-mentioned Step S12, and the process ends.

On the other hand, in the case of "NO" as the determination result in Step S15, the process proceeds to Step S16.

In Step S16, whether or not there is an operation of the parking brake is determined by, for example, whether or not the parking brake switch is ON.

In the case of "YES" as the determination result, the process proceeds to the above-mentioned Step S12 and the process ends.

On the other hand, in the case of "NO" as the determination result in Step S16, the process proceeds to the above-mentioned Step S14 and the process ends.

Hereinafter, a second modified example of this embodiment will be described.

Figure 4:
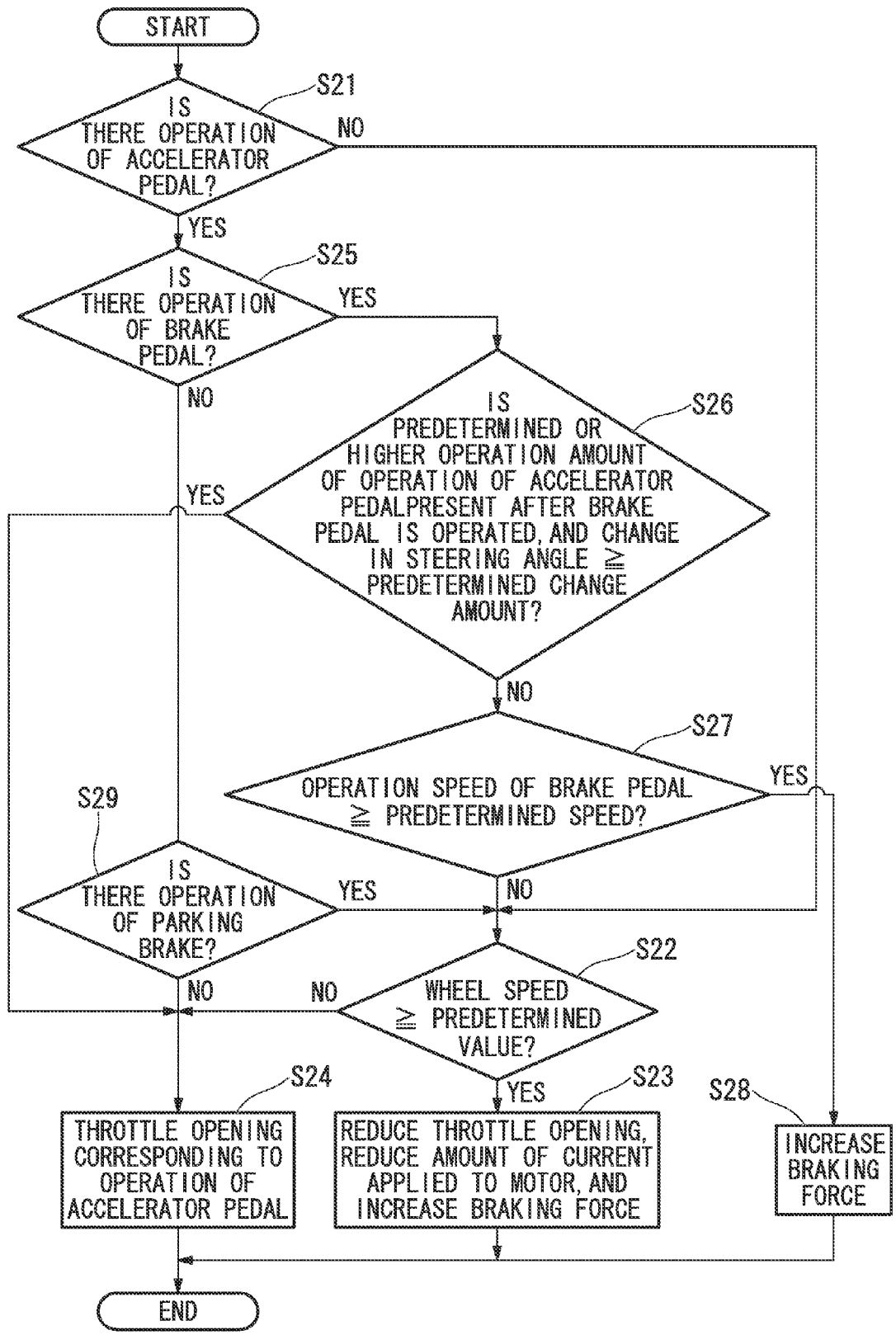
FIG. 4 is a flowchart showing the process of a second modified example of the auxiliary braking device for a vehicle.

In the second modified example, first, for example, in Step S21 shown in FIG. 4, it is determined whether or not there is an operation of the accelerator pedal.

In the case of "YES" as the determination result, the process proceeds to Step S25 described later.

On the other hand, in the case of "NO" as the determination result, the process proceeds to Step S22. In Step S22, it is determined whether or not the wheel speed difference between the wheel speeds of the front wheel and the rear wheel is greater than or equal to the predetermined value.

In the case of "YES" as the determination result in Step S22, the process proceeds to Step S23. In Step S23, the throttle opening is reduced, the amount of current applied to the motor M for running is reduced, and the pressurization amount of the brake fluid pressure of each of the wheel cylinders 3a, 3b, 3c, and 3d is increased, thereby assisting in braking the vehicle, and the process ends.

On the other hand, in the case of "NO" as the determination result in Step S22, the process proceeds to Step S24. In Step S24, assistance in braking the vehicle is not performed, the throttle is controlled to have a throttle opening corresponding to the pressing amount of the accelerator pedal, and the process ends.

In addition, in Step S25, it is determined whether or not there is an operation of the brake pedal 1 by, for example, whether or not the brake switch is ON or by whether or not the brake fluid pressure is greater than or equal to a predetermined pressure.

In the case of "NO" as the determination result in Step S15, the process proceeds to Step S29 described later.

On the other hand, in the case of "YES" as the determination result, the process proceeds to Step S26.

In addition, in Step S26, it is determined whether or not a predetermined or higher operation amount of the pressing operation of the acceleration pedal is present after the operation of the brake pedal 1 and whether or not a change in the steering angle is greater than or equal to a predetermined change amount.

In the case of "YES" as the determination result, the process proceeds to the above-mentioned Step S24.

On the other hand, in the case of "NO" as the determination result in Step S26, the process proceeds to Step S27.

In Step S27, it is determined whether or not the operation speed of the brake pedal 1 is greater than or equal to a predetermined speed.

In the case of "NO" as the determination result, the process proceeds to the above-mentioned Step S22.

On the other hand, in the case of "YES" as the determination result in Step S27, the process proceeds to Step S28. In Step S28, the pressurization amount of the brake fluid pressure of each of the wheel cylinders 3a, 3b, 3c, and 3d is maximized, and the process ends. In addition, in Step S28, the braking force by the motor M for running may be increased by setting the throttle opening to be fully open and stopping application of current to the motor M for running or driving the motor M for running in the reverse direction.

In Step S29, it is determined whether or not there is an operation of the parking brake by, for example, whether or not the parking brake switch is ON.

In the case of "YES" as the determination result, the process proceeds to the above-mentioned Step S22.

On the other hand, in the case of "NO" as the determination result in Step S29, the process proceeds to the above-mentioned Step S24.

According to the second modified example, a driver's intention to accelerate may be precisely reflected in the running behavior of the vehicle.

In addition, in the embodiment described above, the control device 50 may prohibit the assistance in braking the vehicle, for example, in the case where the pressing operation amount of the accelerator pedal is increased after an increase in the pressing operation amount of the brake pedal 1 by the driver (that is, after an increase in the brake fluid pressure corresponding to the pressing operation amount of the brake pedal 1) without attention to the steering angle output from the steering angle sensor 47.

INDUSTRIAL APPLICABILITY

According to the auxiliary braking device for a vehicle, it is possible to precisely reflect a driver's intention during driving in the running behavior of a vehicle while ensuring the running safety of the vehicle even in an incorrect driving operation of the driver.

REFERENCE SIGNS LIST

10: auxiliary braking device for a vehicle
44: accelerator pedal sensor (accelerator pedal operation amount detection unit)
45: brake switch
46: parking brake switch
47: steering angle sensor (steering angle detection unit)
48: fluid pressure sensor (brake pedal operation amount detection unit)
49: wheel speed sensor (wheel speed detection unit)
50: control device
Steps S02, S13, S23, S28: braking assistance unit
Steps S05, S12, S22: wheel speed difference calculation unit
Step S26: prohibition unit
M: motor for running

The invention claimed is:
1. An auxiliary braking device for a vehicle, comprising:
an accelerator pedal operation amount detection unit which detects an operation amount of an accelerator pedal of a vehicle and outputs a signal of the detection result;

a brake pedal operation amount detection unit which detects an operation amount of a brake pedal of the vehicle and outputs a signal of the detection result;

a braking assistance unit which assists in braking the vehicle based on the signal output from each of the accelerator pedal operation amount detection unit and the brake pedal operation amount detection unit;

a wheel speed detection unit which detects a wheel speed which is a rotational speed of a wheel of the vehicle and outputs a signal of the detection result; and a wheel speed difference calculation unit which calculates a wheel speed difference between wheel speeds of a front wheel and a rear wheel based on the signal of the wheel speed output from the wheel speed detection unit and outputs a signal of the calculation result, wherein the braking assistance unit assists in braking the vehicle in a case where the wheel speed difference of the signal output from the wheel speed difference calculation unit is greater than or equal to a predetermined value, and wherein the braking assistance unit assists in braking the vehicle by driving a throttle of the vehicle in a closing direction.

2. The auxiliary braking device for the vehicle, according to claim 1, further comprising a prohibition unit which prohibits the assistance in braking by the braking assistance unit in a case where the operation amount of the accelerator pedal is increased after the operation amount of the brake pedal is increased.

3. The auxiliary braking device for the vehicle, according to claim 1,
wherein: the vehicle includes a motor for traveling the vehicle; and
the braking assistance unit assists in braking the vehicle by reducing or terminating a current supplied to the motor.

4. The auxiliary braking device for the vehicle, according to claim 3, further comprising a prohibition unit which prohibits the assistance in braking by the braking assistance unit in a case where the operation amount of the accelerator pedal is increased after the operation amount of the brake pedal is increased.

5. The auxiliary braking device for the vehicle, according to claim 1,
wherein the braking assistance unit assists in braking the vehicle by increasing a pressurization amount of a wheel cylinder of the vehicle corresponding to the operation amount of the brake pedal.

6. The auxiliary braking device for the vehicle, according to claim 5, further comprising a prohibition unit which prohibits the assistance in braking by the braking assistance unit in a case where the operation amount of the accelerator pedal is increased after the operation amount of the brake pedal is increased.

7. An auxiliary braking device for a vehicle, comprising:
an accelerator pedal operation amount detection unit which detects an operation amount of an accelerator pedal of a vehicle and outputs a signal of the detection result;
a brake pedal operation amount detection unit which detects an operation amount of a brake pedal of the vehicle and outputs a signal of the detection result;
a braking assistance unit which assists in braking the vehicle based on the signal output from each of the accelerator pedal operation amount detection unit and the brake pedal operation amount detection unit;
a wheel speed detection unit which detects a wheel speed which is a rotational speed of a wheel of the vehicle and outputs a signal of the detection result;
a wheel speed difference calculation unit which calculates a wheel speed difference between wheel speeds of a front wheel and a rear wheel based on the signal of the wheel speed output from the wheel speed detection unit and outputs a signal of the calculation result; and
a prohibition unit which prohibits the assistance in braking by the braking assistance unit in a case where the operation amount of the accelerator pedal is increased after the operation amount of the brake pedal is increased
wherein the braking assistance unit assists in braking the vehicle in a case where the wheel speed difference of the signal output from the wheel speed difference calculation unit is greater than or equal to a predetermined value.

8. The auxiliary braking device for the vehicle, according to claim 7, further comprising a steering angle detection unit which detects a steering angle of the vehicle and outputs a signal of the detection result,
wherein the prohibition unit prohibits the assistance in braking by the braking assistance unit in a case where a change amount of the steering angle obtained from the steering angle detection unit is greater than or equal to a predetermined steering angle change amount and the operation amount of the accelerator pedal is increased after the operation amount of the brake pedal is increased.

* * * * *